United States Patent
Kim

(10) Patent No.: US 7,790,307 B2
(45) Date of Patent: Sep. 7, 2010

(54) STRUCTURE AND OPERATION METHOD OF BATTERY PACK

(75) Inventor: Te-Hyun Kim, Kyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 1580 days.

(21) Appl. No.: 10/724,557

(22) Filed: Nov. 26, 2003

(65) Prior Publication Data

US 2004/0121223 A1 Jun. 24, 2004

(30) Foreign Application Priority Data

Nov. 29, 2002 (KR) .................. 10-2002-0075483

(51) Int. Cl.
*H01M 10/42* (2006.01)

(52) U.S. Cl. ........................ 429/122; 429/61

(58) Field of Classification Search ............... 429/61, 429/149, 50, 122, 126, 7, 178, 121
See application file for complete search history.

(56) References Cited

FOREIGN PATENT DOCUMENTS

JP 10341535 12/1998

*Primary Examiner*—Jennifer Michener
*Assistant Examiner*—Monique Wills
(74) *Attorney, Agent, or Firm*—Lee, Hong, Degerman, Kang & Waimey

(57) ABSTRACT

A battery pack for reducing a memory effect is disclosed. The battery pack includes at least one or more battery cells. A battery cell with the smallest residual voltage is selected from battery cells each having a residual voltage greater than a minimum threshold voltage, and first charged. Power is supplied to a terminal from a battery cell having the smallest residual voltage among battery cells having the residual voltage greater than the minimum threshold voltage, thereby lengthening a life span of the battery pack.

14 Claims, 4 Drawing Sheets

STRUCTURE AND OPERATION METHOD OF BATTERY PACK

CROSS-REFERENCE TO RELATED APPLICATIONS

Pursuant to 35 U.S.C. §119(a), this application claims the benefit of earlier filing date and right of priority to Korean Application No. 75483/2002, filed on Nov. 29, 2002, the contents of which are hereby incorporated by reference herein in their entirety.

BACKGROUND OF THE INVENTION

1. Field of the Invention

The present invention relates to a battery of a mobile communication terminal and, more particularly, to a structure and operation method of a battery pack adapted for minimizing a memory effect.

2. Description of the Background Art

In general, various types of electric/electronic devices are driven by electrical power, and fixed large-scale electric/electronic devices having a large volume or weight are supplied with power converted by a voltage booster or voltage reducer.

Meanwhile, in case of portable electric/electronic devices such as notebook computers or mobile phones, they are generally supplied with power from a battery because of their incapability of receiving power converted by the voltage booster or the voltage reducer.

The voltage of a battery attached to the electric/electronic device is discharged as time lapses. Thus, if a charged voltage in the battery is discharged to a level below a predetermined voltage, the battery is placed in a charging unit for charging in order to normally operate the electric/electronic devices.

When the battery is charged by using the charging unit, the battery is usually charged in a state that it has not been completely discharged. Namely, before the battery is completely discharged, it is placed in the charging unit for charging thereof. As a result, even after charging is terminated, the battery fails to maintain a level above a predetermined voltage, which is called a memory effect. The reason is that if the battery mounted in the electric/electronic device is re-charged in such a state that it has been discharged to a level below a predetermined voltage, re-charging takes place at above a predetermined voltage, so the battery remembers only the voltage state.

In other words, an initially charged battery continuously provides a normal voltage to the electric/electronic device for a predetermined time, but if the battery has been charged and discharged by more than a certain number of times, it would not be fully charged even after charging due to the memory effect and ocan only be charged to below a predetermined voltage level. Consequently, since the battery fails to output a continuous voltage for a predetermined time, the electric/electronic device or equipment may not operate in an optimal manner.

Therefore, in order to minimize the memory effect of the battery, the battery should be completely discharged before re-charging, but usually, the battery is re-charged with a residual voltage not enough for the electric/electronic device to normally operate, so the memory effect inevitably causes the life span of the chargeable battery pack to decrease.

In order to reduce the memory effect of the battery pack, conventionally, the residual voltage is measured by the charging unit, and if the measured residual voltage is greater than a threshold value, the battery is forcibly discharged to drop the residual voltage to below the threshold value, and then, charging is started. There are several techniques and patents for such a charging device as described above, but no method for removing the memory effect by the memory pack itself has been proposed.

In addition, in the conventional art, in case that a battery pack includes a plurality of battery cells, the battery cells are connected in parallel, so all the battery cells are simultaneously charged and used up, resulting in a degradation of charging and discharging efficiency.

The above references are incorporated by reference herein where appropriate for appropriate teachings of additional or alternative details, features and/or technical background.

SUMMARY OF THE INVENTION

Therefore, an object of the present invention is to provide a battery pack with an extended life span by minimizing a memory effect.

Another object of the present invention is to provide an operation method of a battery pack of which one of a plurality of battery cells can be selectable for use of charging or supplying a current.

Still another object of the present invention is to provide a battery pack with a stability and efficiency by being switched to several operation modes depending on voltage levels.

To achieve at least the above objects in whole or in parts, there is provided a battery pack including: at least one or more battery cells; first and second switches connected to each battery cell; a switch controller for controlling the first and second switches; a voltage measuring unit for measuring a voltage of a battery cell through the first and second switches; and a controller for selecting one or several battery cells according to a residual voltage of each battery cell and a control signal of a terminal, and performing charging of a battery cell or supplying of power.

Preferably, the battery pack additionally includes an interface unit for interface unit for interfacing an external terminal and a charging unit.

Preferably, the interface unit includes a power input terminal for transferring power supplied from the charging unit to the first switch; a power supply unit for supplying power of a battery cell received through the second switch to the terminal; a command input terminal for outputting a control signal of the terminal to the controller; and a command output terminal for outputting result data of the controller to the terminal.

Preferably, the first switch is a charge switch and the second switch is a supply switch.

Preferably, the control signal of the terminal indicates a mode change, a switch manipulation and measurement of a residual voltage of a battery cell.

Preferably, the controller includes: a voltage measuring unit for measuring a charge voltage and residual voltage of battery cells; a command interpreting and controlling unit for performing a controlling operation according to the measurement voltage of the voltage measuring unit and a control signal of the terminal; and a switch controller for controlling the plural first and second switches according to a control signal of the command interpreting and controlling unit.

Preferably, the controller depends only on the control signal of the terminal in a manual mode and performs charging of the battery cell or power supplying by itself according to the residual voltage of the battery cell regardless of the control signal in an automatic mode.

Preferably, the controller selects and charges a battery cell having the least memory effect according to a residual voltage of the battery cell. In this case, the controller charges the battery cells in a sequential order beginning with those battery cells having the least memory effect according to residual voltages of battery cells.

Preferably, the controller selects only those battery cells having a residual voltage greater than a minimum threshold voltage from a plurality of battery cells, and uses the selected battery cells for supplying power to the terminal. In this case, the controller sequentially supplies power to the terminal using the battery cells beginning with the battery cell having the smallest residual voltage.

Preferably, if the residual voltage of a plurality of battery cells is lower than the minimum threshold voltage, the controller is switched to a basic mode for performing charging and power supplying by connecting all the battery cells in parallel.

Preferably, when there is an external request for a residual voltage measurement of a battery cell, the controller measures and reports a voltage of each battery cell.

To achieve at least these advantages in whole or in parts, there is further provided a method for charging a battery pack having at least one or more battery cells and supplying power, including: selecting a battery cell with the smallest memory effect from a plurality of battery cells and charging the selected battery cell; and selecting a battery cell with the smallest memory effect from the charged plurality of battery cells and supplying power to a terminal.

Preferably, the charging step includes: measuring residual voltages of each battery cell; comparing the measured residual voltages with the minimum threshold voltage; and selecting a battery cell having the smallest residual voltage among residual voltages which are greater than the minimum threshold voltage and charging the selected battery cell.

Preferably, the residual voltage of the selected battery cell is greater than the minimum threshold value but smaller than a reference threshold voltage.

Preferably, the reference threshold voltage is the lowermost voltage in a range of maximum charge voltages.

Preferably, the charging and discharging method additionally includes connecting the plurality of battery cells in parallel and charging these battery cells if there is no residual voltage greater than a minimum discharge threshold voltage.

Preferably, the power supply step includes: measuring each residual voltage of the plurality of battery cells; comparing the measured residual voltages with/the minimum threshold voltage; and supplying power of a battery cell, having the smallest residual voltage among residual voltages which are greater than the minimum threshold voltage, to the terminal.

Preferably, the charging and discharging method additionally includes connecting the plurality of battery cells in parallel and supplying power if there is no residual voltage greater than the minimum threshold voltage.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

A preferred embodiment of the present invention will now be described.

In general, if a residual voltage of a battery cell is small, there would be a small memory effect. In addition, if power is supplied to a terminal from a battery cell having the smallest residual voltage among a plurality of charged battery cells, the memory effect can be minimized.

Accordingly, the present invention proposes a method where, in a battery pack having at least one or more battery cells, a battery having the smallest residual voltage is selected from battery cells each having a residual voltage which is greater than a minimum threshold voltage, and charged, and then, power is supplied to a terminal from the battery cell having the smallest residual voltage, thereby increasing a life span of the battery pack.

In addition, the present invention proposes a battery pack whereby an operation mode is switched according to a control signal of a terminal or a residual voltage of a battery cell to prevent an unnecessary operation of a device, thereby improving efficiency and stability of the battery pack.

Figure 1:
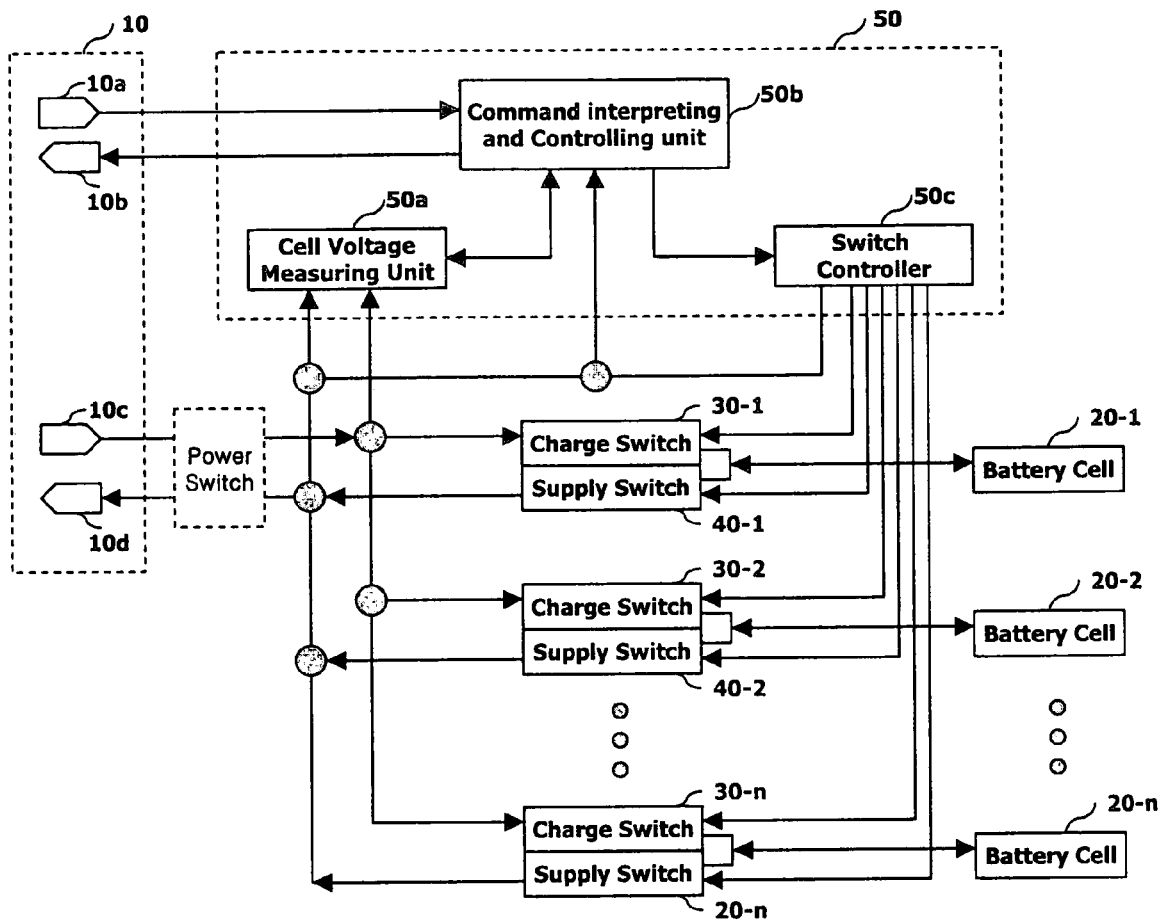
FIG. 1 is a schematic block diagram of a battery pack in accordance with a preferred embodiment of the present invention.

FIG. 1 is a schematic block diagram showing an example of a battery pack in accordance with the present invention.

With reference to FIG. 1, the battery pack in accordance with the present invention includes: an interface unit 10 connected to an external charging unit; a plurality of battery cells 20-1~20-n; a plurality of charge switches 30-1~30-n for transferring power provided through the external charging unit from the interface unit 10 to the plurality of battery cells 20-1~20-n; a plurality of supply switches (40-1~40-n) for transferring a charge voltage of the plurality of battery cells 20-1~20-n to a terminal through the interface unit 10; and a controller 50 for measuring charge and residual voltages of battery cells 20-1~20-n and controlling a switching operation of the plurality of charge switches 30-1~30-n and supply switches 40-1~40-n.

The interface unit 10 includes a command input terminal 10a for inputting a control command of the terminal, a command output terminal 10b for transferring output data of the controller 20 to the terminal according to a control command of the terminal, a charging terminal 10c connected to an external charging unit, and a supply terminal 10d for providing charge voltage of the plurality of battery cells 20-1-20-n to the terminal.

The controller 50 includes a voltage measuring unit 50a for measuring a charge and residual voltage of each battery cell (20-1~20-n); a command interpreting and controlling unit 50b for outputting a control signal on the basis of the measured voltage of the voltage measuring unit 50-1 and the control command of the terminal; and a switch controller 50c for controlling the plurality of charge switches 30-1~30-n and the supply switches 40-1~40-n according to the control signal of the command interpreting and controlling unit 50b.

The voltage measuring unit 50a, the command interpreting and controlling unit 50b and the switch controller 50c are driven by a charge voltage of the battery cells 20-1~20-n, and implemented as a low voltage logical circuit or a microcomputer.

The battery pack includes at least one or more battery cells 20-1~20-n. Each battery cell is charged by being connected to a charge terminal 10c of the interface unit 10 through the charge switch, and supplies a current to an external terminal by being connected to a supply terminal 10d of the interface unit 10 through the supply switch. Therefore, one battery cell includes one charge switch and one power supply switch.

Preferably, the command interpreting and controlling unit 50b of the controller 50 is implemented as the low voltage logical circuit. The command interpreting and controlling unit 50b can connect one or several battery cells 20-1-20-n to the charge terminal 10c or to the supply terminal 10d by manipulating the charge switches 30-1~30-n and the supply switches 40-1~40-n through the switch controller 50c. The command interpreting and controlling unit 50b can read each voltage (charge and residual voltage) of the battery cells (20-1~20-n) through the cell voltage measuring unit 50a, and can know whether charging of the battery pack has been started.

In this manner, the command interpreting and controlling unit 50b detects the battery cell with the lowest residual voltage by measuring each residual voltage of the battery cells 20-1~20-n through the switch controller 50c and the voltage measuring unit 50a, and charges the corresponding battery cell by connecting a charge switch for the battery cell to the charge terminal.

In addition, the command interpreting and controlling unit 50b detects the battery cell with the lowest residual voltage among battery cells each having residual voltages which are greater than a specific voltage threshold value (a minimum threshold voltage) by measuring charge voltages of each battery cell 20-1-20-n through the switch controller 50c and the voltage measuring unit 50a, and supplies power to the terminal by connecting only a supply switch for the battery cell to the supply terminal 10d. If there is no battery cell maintaining a charge voltage which is greater than the specific voltage threshold value, the command interpreting and controlling unit 50b selects the battery cell with the lowest charge voltage, or selects all the battery cells and connects them in parallel to supply power thereto.

Also, the command interpreting and controlling unit 50b can manipulate the charge switches 30-1~30-n and the supply switches 40-1~40-n through the switch controller 50c according to the control signal inputted from the external terminal through the command input terminal 10a of the interface unit 10, process the control signal by reading the measured voltage of each battery cell (20-1~20-n) through the voltage measuring unit 50a according to the control signal, and supply an output control signal for the control signal to the external terminal through the command output terminal 10b.

The command input terminal 10a and the command output terminal 10b are serial or parallel terminals, to which a control signal having a relatively simple format is transferred. Preferably, the command input terminal 10a and the command output terminal 10b are constructed as serial terminals, rather than parallel terminals. A serial terminal comprises a control terminal and a clock terminal. A control signal (that is, bits of a command signal) and a value signal are transmitted in series through the control terminal. In this case, whenever a clock signal transferred through the clock terminal is transited from a high level to a low level, an interface is used to transmit each bit of the command signal and the value signal.

[Table 1] shows an example of control signals and data values (output control signals) transmitted between the terminal and the battery pack through the command input terminal 10a and the command output terminal 10b.

TABLE 1

| Port | Control signal type | Command signal | Value signal |
|---|---|---|---|
| Command input terminal | Manual mode change | 10000000 | 00000000 |
| | Automatic mode change | 10000000 | 00000001 |
| | Switch manipulation | 10000001 | Bit 0-7 |
| | Residual voltage measurement | 10000010 | None |
| Command output terminal | Command acknowledgement | 10000000 | 00000000 or 11111111 |
| | Residual voltage | 10000001 | 0x00~0xff |

[Table 1] is for a battery pack including four battery cells. In [Table 1], bits 0~3 are values for each charge switch, and if each bit value is '1', it signifies a connection, and '0' signifies a disconnection.

Figure 2:
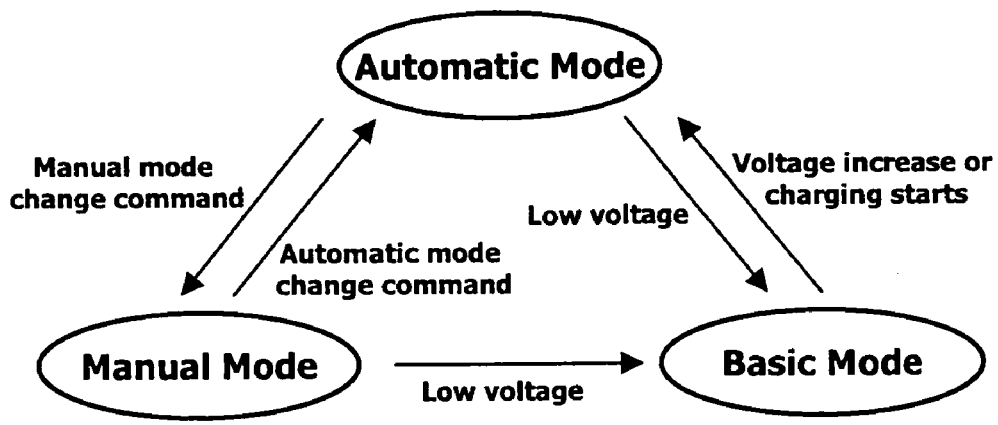
FIG. 2 illustrates the transition of an operation mode of the battery pack.

As shown in FIG. 2, the battery pack in accordance with the present invention can operate in three modes: a basic mode, an automatic mode and a manual mode, which are determined by a residual voltage level of the battery pack and a control signal inputted from a charge device (or the terminal).

The basic mode is used when charging is not performed, in which each residual voltage of the battery cells 20-1~20-n is extremely low. In the basic mode, operations of the voltage measuring unit 50a, the command interpreting and controlling unit 50b and the switch controller 50c of the controller 50 are all stopped. The reason is because the elements of the controller 50 are implemented as a logical circuit or a microcomputer, they may malfunction at low voltages.

The automatic mode is used when the battery pack itself manipulates the charge switches 30-1~30-n and the supply switches 40-1~40-n to selectively connect the battery cells 20-1~20-n to the charge terminal 10c or the supply terminal 10d. In the automatic mode, the voltage measuring unit 50a, the command interpreting and controlling unit 50b and the switch controller 50c operate.

The manual mode is performed only by a control command inputted from an external source. In the manual mode, switching of the charge switches 30-1~30-n and the supply switches 40-1~40-n is made only by the external control command. When the automatic mode is transited to the manual mode, the charge switches 30-1~30-n and the supply switches 40-1~40-n are maintained in the connected state.

The manual mode can be performed by using the command input terminal 10a and the command output terminal 10b of the interface unit 10 as shown in FIG. 1, or can be performed by manipulation of the external terminal or by a selector provided in a charging unit.

That is, the basic mode of the battery pack is the automatic mode. If the selector provided in the charging unit (or the terminal) inputs a control signal, that is, a 16 bit command signal ('10000000') and a value signal ('00000000'), through the command input terminal 10a of the interface unit 10 in order to switch from the automatic mode to the manual mode, the controller 20 outputs the command signal ('10000000') and the value signal ('00000000') as a command acknowledge signal through the command output terminal 10b to inform the terminal that the automatic mode has been switched to the manual mode. At this time, '0' signifies that the command has been successfully performed, while '0xff' signifies a failure.

In addition, the operation of the battery cell can be controlled through switch manipulation or by inputting a control signal for a residual voltage measurement.

For instance, when a control signal for measuring a residual voltage of a battery cell, that is, a command signal ('10000010'), is inputted, the command interpreting and controlling unit 50$b$ of the controller 50 controls the switch controller 50$c$ and the cell voltage measuring unit 50$a$ to measure a residual voltage of battery cells 20-1~20-$n$ and outputs the measured residual voltage to the terminal through the command output terminal 10$b$. In other words, in the manual mode, all the charge switches 30-1~30-$n$ and the supply switches 40-1~40-$n$ are maintained in the connected state, so that the cell voltage measuring unit 50$a$ can measure the residual voltage of each battery cell 20-1~20-$n$ and outputs such to the command interpreting and controlling unit 50$b$.

In this case, if a residual voltage of the battery cell 20-1 is '0', a command signal '10000001' and a value signal '0x00' would be outputted from the command interpreting and controlling unit 50$b$ to the command output terminal 10$b$. Or, if the residual voltage is a fully-charged voltage, the command signal '10000001' and a value signal '0xff' would be outputted.

Accordingly, the terminal receives the residual voltage data of the battery cell and inputs a control signal for a switch (the supply switch or the supply switch) manipulation to charge a desired battery cell, or a voltage charged in the battery cell can be provided to the terminal. For instance, if power inputted from the charging device is desired to be supplied to a second battery cell 20-2, a command signal '10000001' and a value signal '00000010' for connecting the charge switch 30-2 are inputted to the command input terminal 10$a$. Then, the command interpreting and controlling unit 50$b$ turns on the charge switch 30-2 according to the command signal and the value signal, whereby power inputted from the external charging device is charged to the battery cell 20-2.

With reference to FIG. 2, the command interpreting and controlling unit 50$b$ checks residual voltages of each battery cell, and if the residual voltages of each battery cell 20-1~20-$n$ are smaller than a pre-set threshold voltage, the mode is automatically switched to the basic mode. And when charging is started in the manual mode, if the charge voltage of the battery cell is greater than a minimum threshold value, the mode is automatically switched from the basic mode to the automatic mode.

The change from the manual mode to the automatic mode can be performed by the selector of the external charging device. Once the mode is changed to the automatic mode, the command interpreting and controlling unit 50$b$ does not depend on the control signal inputted to the command input terminal 10$a$.

The charging and power supplying method in the automatic mode of the battery pack will now be described with reference to FIGS. 3 and 4.

Figure 3:
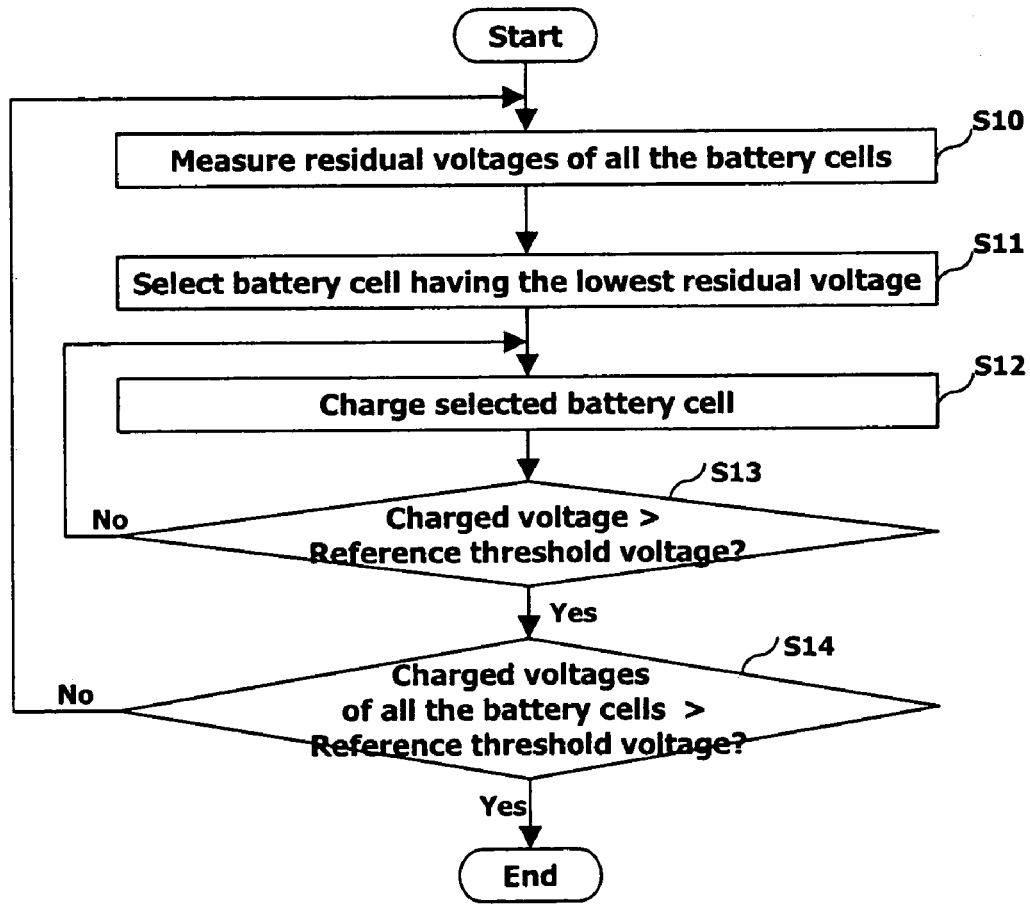
FIG. 3 is a flow chart of a method for charging the battery pack in accordance with the preferred embodiment of the present invention.

FIG. 3 is a flow chart of a method for charging a battery pack in the automatic mode in accordance with the present invention.

Usually, the basic mode of the battery pack is the automatic mode. When the battery pack is connected to the external charging device through the interface unit 10, the command interpreting and controlling unit 50$b$ of the controller 50 controls the switch controller 50$c$ and the voltage measuring unit 50$a$ to measure residual voltages of all the battery cells 20-1~20-$n$ (step S10). At this time, the command interpreting and controlling unit 50$b$ reads in a latch form the residual voltages of each battery cell supplied through the supply switches 40-1~40-$n$ from the voltage measuring unit 50$a$. While the residual voltage is measured, the command interpreting and controlling unit 50$b$ controls the power switch shown in the dotted line box of FIG. 1 to temporarily cut off power being inputted through the charge terminal 10$c$.

After the residual voltages of all the battery cell are measured, the command interpreting and controlling unit 50$b$ selects one battery cell having the lowest residual voltage among the measured residual voltages (step S11), and controls the power switch and the switch controller 50$c$ to connect only a charge switch connected to the selected battery cell to the charge terminal 10$c$. In this case, the residual voltage of the selected battery cell should be greater than the minimum threshold voltage. For example, if the battery cell 20-1 is selected, only the charge switch 30-1 is connected to the charge terminal 10$c$ through the power switch in order to charge the corresponding battery cell 20-1.

The selected battery cell 20-1 is continuously charged until the charge voltage reaches a reference threshold value, that is, a full_charge threshold (step S12). In this case, the reference threshold voltage refers to a fully charged voltage, that is, the lowest value in an error range in a maximum capacity that the battery cell. For example, assuming that the fully charged voltage is in the range of 3.9V~4.3V, the reference threshold voltage is 3.9V. The fully charged voltage may differ for manufacturers of the battery cells.

In the course of charging, the command interpreting and controlling unit 50$b$ continuously measures the charge voltage of the battery cell 20-1 through the voltage through the voltage measuring unit 50$a$ to check whether the charged voltage of the battery cell 20-1 is greater than the reference threshold value (step S13). For this purpose, the command interpreting and controlling unit 50$b$ also turns on the supply switch 40-1 when turning on the charge switch 30-1.

Upon checking, if the charged voltage of the battery cell 20-1 is smaller than the reference threshold value, step S12 is performed again. If, however, the charged voltage of the battery cell 20-1 exceeds the reference threshold value, the steps S10 through S13 are repeatedly performed in order to select another battery cell (step S14).

Figure 5:
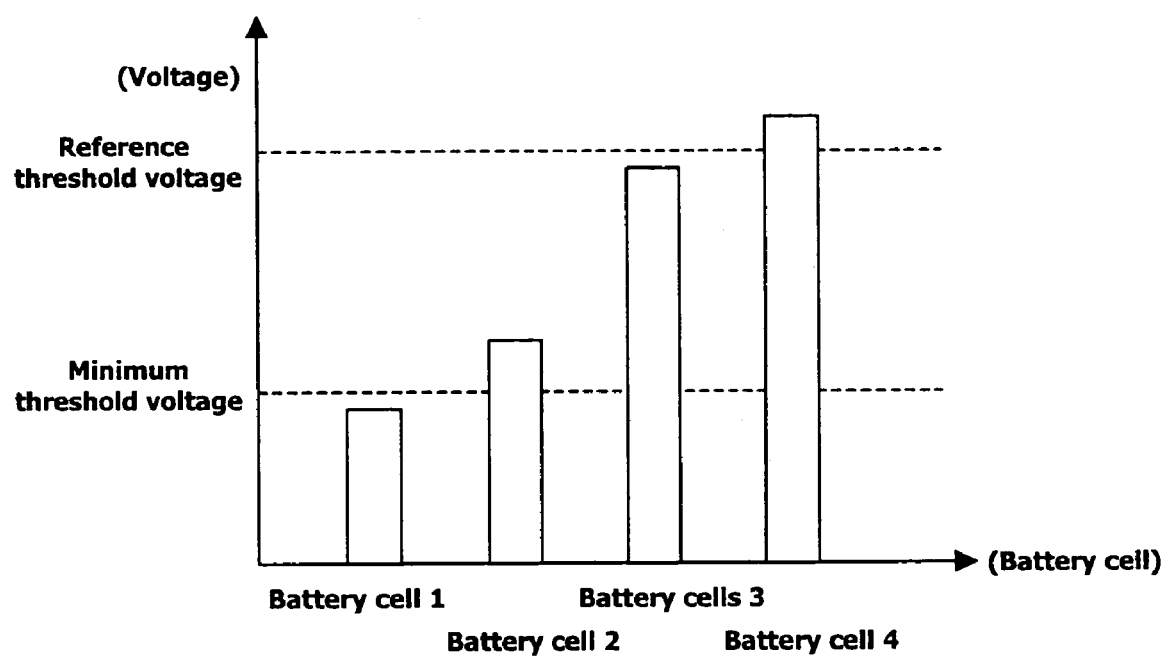
FIG. 5 is a graph showing residual voltages of four battery cells of a battery pack.

Accordingly, in one embodiment of the present invention, if the battery pack consists of 4 battery cells as shown in FIG. 5, the first battery cell having the lowest residual voltage would be charged first, and then the second battery cell and the third battery cell would be charged in turn. In case of the fourth battery cell, because its residual voltage is greater than the reference threshold voltage, the fourth battery cell would not be charged.

Thereafter, when the charged voltages of all the battery cells exceed the reference threshold value (step S14), the command interpreting and controlling unit 50$b$ completes the charging operation.

In addition, in the course of performing the charging operation, if all the battery cells are in an extremely low voltage state (the mode is switched to the manual mode) or if a switching command to the manual mode is inputted from an external source through the interface unit 10, the operations are terminated.

If the residual voltages of all the battery cells are smaller than the minimum threshold value in the automatic mode, it is switched to the basic mode in which all the battery cells are connected in parallel and charging is performed, thereby increasing the stability of the battery pack.

Figure 4:
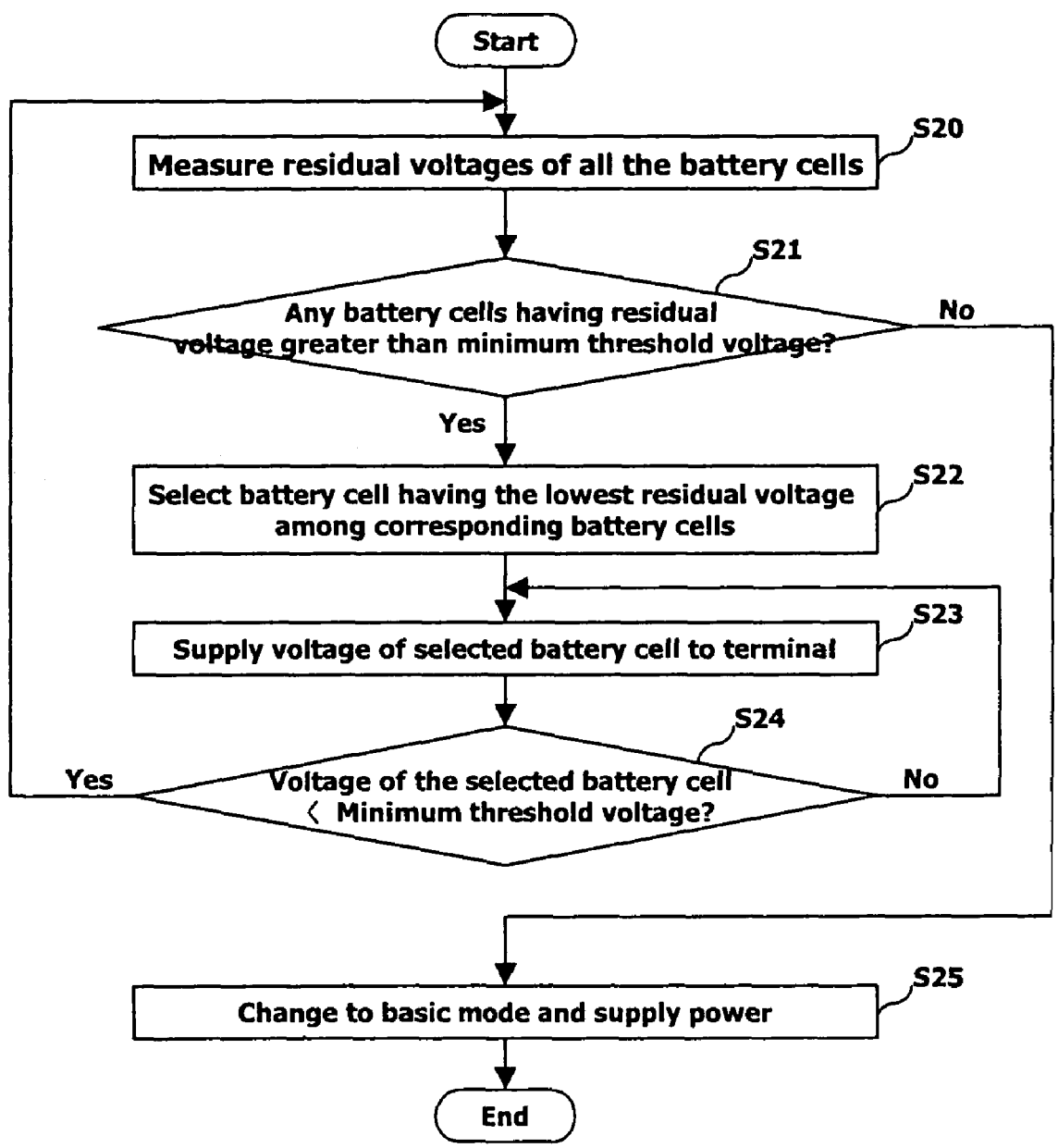
FIG. 4 is a flow chart of a method for supply power of the battery pack in accordance with the preferred embodiment of the present invention.

FIG. 4 is a flow chart of a power supply method of the battery pack in the automatic mode in accordance with the present invention.

When the battery pack is mounted to the terminal through the interface unit 10, the command interpreting and controlling unit 50b of the controller 50 controls the switch controller 50c and the voltage measuring unit 50a to measure residual voltages of all the battery cells 20-1~20-n (step S20). At this time, the command interpreting and controlling unit 50b reads in a latch form residual voltages of each battery cell supplied through the supply switches 40-1~40-n from the voltage measuring unit 50a. In addition, while measuring the residual voltages, the command interpreting and controlling unit 50b controls the power switch of FIG. 1 and temporarily cuts off power outputted through the supply terminal 10d.

After all the residual voltages of the battery cells are measured, the command interpreting and controlling unit 50b checks whether there exists a battery cell having a residual voltage greater than the minimum threshold voltage among the measured residual voltages (step S21). The step S21 is both for selecting a battery cell that is expected to have the smallest memory effect and for checking an extremely low voltage state.

If all the residual voltages of every battery cell are smaller than the minimum threshold voltage, the mode of the battery pack is switched from the automatic mode to the basic mode. Meanwhile, if there is a battery pack having a residual voltage which is greater than the minimum threshold voltage, corresponding battery cells are put on an available cell list.

The command interpreting and controlling unit 50b selects a battery cell having the lowest residual voltage, that is, for example, the battery cell 20-2, from the available cell list (step S22), and controls the power switch and the switch controller 50c to connect only the supply switch 40-2 connected to the selected battery cell to the supply terminal 10d. Accordingly, the charged voltage of the corresponding battery cell 20-2 is provided to the terminal through the supply terminal 10d (step S23).

Thereafter, the command interpreting and controlling unit 50b continuously measures the residual voltage of the battery cell 20-2 being currently used (step S24), and if the residual voltage drops down to below the minimum threshold voltage as shown in FIG. 5, it returns to the step S20 to select another battery cell. For this purpose, the command interpreting and controlling unit 50b also turns on the charge switch 30-2 when it turns on the supply switch 40-2.

Accordingly, if the battery pack consists of four battery cells as shown in FIG. 5, the second battery cell would first supply power to the terminal, and then the third one and fourth one in turn. The first battery can not supply power because its residual voltage is smaller than the minimum threshold voltage.

The steps S20~S24 are repeatedly performed and if residual voltages of every battery cell is smaller than the minimum threshold voltage, the mode of the battery pack is switched from the automatic mode to the basic mode to supply power.

In the basic mode, the operation of every element of the controller 50 are stopped, and since all the supply switches 40-1~40-n are in an ON state, power of the battery cells connected in parallel is supplied to the terminal.

Although the present invention describes the operations of selecting one battery cell for charging or power supplying merely for the sake of explanation, several battery cells can be used as necessary without being restricted thereto. This can be easily understood by a person with an ordinary skill in the art upon review of the descriptions of the present invention.

As so far described, the structure and operation method of a battery pack in accordance with the present invention has the following advantages.

That is, one or several battery cells of a battery pack is/are selected to be used for charging or power supplying, and the charge mode is automatically changed according to the charged voltage of the battery cell, so that the stability and efficiency of the battery pack can be improved. In addition, by reducing the memory effect, the overall life span of the battery pack can be lengthened.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A battery pack comprising:
    at least one battery cell;
    first and second switches connected to each of the at least one battery cell;
    a switch controller for controlling the first and second switches, wherein the first and second switches perform either charging of the at least one battery cell or supplying power from the at least one battery cell;
    a voltage measuring unit for measuring a voltage of the at least one battery cell via the first and second switches; and
    a controller programmed to select the at least one battery cell according to a residual voltage of each battery cell and a control signal of a terminal, and controlling the switch controller.

2. The battery pack of claim 1 further comprises:
    an interface unit for interfacing an external terminal and a charging unit.

3. The battery pack of claim 2, wherein the interface unit comprises:
    a power input terminal for transferring power supplied from the charging unit to the first switch;
    a power supply unit for supplying power of the at least one battery cell received via the second switch to the terminal;
    a command input terminal for outputting a control signal of the terminal to the controller; and
    a command output terminal for outputting result data of the controller to the terminal.

4. The battery pack of claim 1, wherein the first switch is a charge switch and the second switch is a supply switch.

5. The battery pack of claim 1, wherein the control signal of the terminal indicates a mode change, a switch manipulation and measurement of a residual voltage of the at least one battery cell.

6. The battery pack of claim 1, wherein the controller comprises:
    a voltage measuring unit for measuring a charge voltage and residual voltage of the at least one battery cell;
    a command interpreting and controlling unit for performing a controlling operation according to the measurement voltage of the voltage measuring unit and a control signal of the terminal; and
    a charge switch controller for controlling the switch controller according to a control signal of the command interpreting and controlling unit.

7. The battery pack of claim 6, wherein the voltage measuring unit, the command interpreting and controlling unit, and the charge switch controller are implemented as either a low voltage logical circuit or a microcomputer.

8. The battery pack of claim 1, wherein the controller switches to a manual mode according to the control signal to perform either charging the at least one battery cell or supplying power from the at least one battery cell according to the residual voltage of each of the at least one battery cell.

9. The battery pack of claim 8, wherein the controller selects and charges the at least one battery cell having the least memory effect according to the residual voltage of each of the at least one battery cell.

10. The battery pack of claim 9, wherein the controller charges the at least one battery cell in a sequential order beginning with battery cell having the least memory effect according to the residual voltage of each of the at least one battery cell.

11. The battery pack of claim 8, wherein the controller selects each of the at least one battery cell having a residual voltage greater than a minimum threshold voltage and uses the selected battery cells for supplying power to the terminal.

12. The battery pack of claim 10, wherein the controller sequentially supplies power to the terminal using the at least one battery cell having the smallest residual voltage.

13. The battery pack of claim 8, wherein if the residual voltage of each of the at least one battery cell is lower than the minimum threshold voltage, the controller is switched to a basic mode for performing a charge and supplying power via the first and second switches by connecting all of the at least one battery cell in parallel.

14. The battery pack of claim 8, wherein the controller measures and reports a voltage of each of the at least one battery cell if there is an external request for a residual voltage measurement.

* * * * *